US009939606B2

(12) United States Patent
Kim

(10) Patent No.: US 9,939,606 B2
(45) Date of Patent: *Apr. 10, 2018

(54) LENS DRIVING APPARATUS

(71) Applicant: LG INNOTEK CO., LTD., Seoul (KR)

(72) Inventor: Ji Hoon Kim, Gunpo-si (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,978

(22) Filed: Apr. 30, 2013

(65) Prior Publication Data

US 2013/0235481 A1    Sep. 12, 2013

Related U.S. Application Data

(63) Continuation of application No. 12/910,293, filed on Oct. 22, 2010, now Pat. No. 8,451,553, which is a
(Continued)

(30) Foreign Application Priority Data

Nov. 23, 2006    (KR) .......................... 10-2006-0116317

(51) Int. Cl.
*G02B 7/02*    (2006.01)
*G03B 3/10*    (2006.01)
(Continued)

(52) U.S. Cl.
CPC .......... *G02B 7/023* (2013.01); *G02B 27/0006* (2013.01); *G03B 3/10* (2013.01);
(Continued)

(58) Field of Classification Search
CPC .. G02B 7/023; G02B 27/0006; G11B 7/0933; G11B 7/0935; H02K 41/0356; G03B 3/01
(Continued)

(56) References Cited

U.S. PATENT DOCUMENTS 5,177,640 A *    1/1993    Grassens .................... 359/814
6,856,469 B2    2/2005    Yoneyama et al.
(Continued)

FOREIGN PATENT DOCUMENTS

CN    1763623 A    4/2006
CN    1831576 A    9/2006
(Continued)

OTHER PUBLICATIONS

Office Action dated Apr. 18, 2014 in Korean Application No. 10-2013-0045730.
(Continued)

*Primary Examiner* — Alicia M Harrington
(74) *Attorney, Agent, or Firm* — Saliwanchik, Lloyd & Eisenschenk

(57) ABSTRACT

Disclosed is a lens driving apparatus. The lens driving apparatus includes a base, a yoke coupled to the base, having an upper surface formed with a hole, a closed side surface, and an opened bottom surface, a bobbin movably installed in an inner portion of the yoke, a lens module coupled to the bobbin to go in and out the hole according to movement of the bobbin, a magnet fixed to an inner portion of the yoke, a coil fixed to an outer portion of the bobbin while facing the magnets, and springs coupled to the bobbin to provide restoration force to the bobbin.

19 Claims, 2 Drawing Sheets

Related U.S. Application Data continuation of application No. 12/516,146, filed as application No. PCT/KR2007/005901 on Nov. 22, 2007, now Pat. No. 7,885,023.

(51) Int. Cl.
  *G11B 7/09* (2006.01)
  *H02K 41/035* (2006.01)
  *G02B 27/00* (2006.01)

(52) U.S. Cl.
  CPC .......... *G11B 7/0933* (2013.01); *G11B 7/0935* (2013.01); *H02K 41/0356* (2013.01)

(58) Field of Classification Search
  USPC .................... 359/817, 819, 822–824, 704
  See application file for complete search history.

(56) References Cited

U.S. PATENT DOCUMENTS

| | | | |
|---|---|---|---|
| 7,298,562 B2 | 11/2007 | Sue et al. | |
| 7,394,603 B2 | 7/2008 | Shiraki et al. | |
| 7,400,068 B2 | 7/2008 | Tseng | |
| 7,649,703 B2 * | 1/2010 | Shiraki et al. | 359/824 |
| 7,916,412 B2 * | 3/2011 | Li et al. | 359/824 |
| 8,451,553 B2 * | 5/2013 | Kim | 359/824 |
| 2006/0028320 A1 | 2/2006 | Osaka | |
| 2006/0034599 A1 * | 2/2006 | Osaka | 396/144 |
| 2006/0181632 A1 | 8/2006 | Makii et al. | |
| 2007/0091199 A1 | 4/2007 | Shiraki et al. | |
| 2007/0110424 A1 | 5/2007 | Iijima et al. | |
| 2007/0133110 A1 | 6/2007 | Huang | |
| 2008/0055752 A1 | 3/2008 | Ishizawa et al. | |
| 2008/0117536 A1 | 5/2008 | Higuchi | |

FOREIGN PATENT DOCUMENTS

| | | |
|---|---|---|
| DE | 20-2006-009115 U1 | 8/2006 |
| EP | 1698925 A1 | 9/2006 |
| EP | 1970741 A1 | 9/2008 |
| JP | 2003-005014 A | 1/2003 |
| JP | 2003149537 A | 5/2003 |
| JP | 2005-173431 A | 6/2005 |
| JP | 2005-234404 A | 9/2005 |
| JP | 2006-047342 A | 2/2006 |
| JP | 2006-074990 | 3/2006 |
| JP | 2006-259032 A | 9/2006 |
| KR | 10-1999-0009117 A | 2/1999 |
| KR | 20-0370323 | 12/2004 |
| KR | 10-2005-0029700 A | 3/2005 |
| KR | 10-2005-0082413 A | 8/2005 |
| KR | 10-2005-0093111 A | 9/2005 |
| KR | 10-0548869 B1 | 1/2006 |
| KR | 10-2006-0023760 A | 3/2006 |
| KR | 10-2006-0084130 A | 7/2006 |
| KR | 10-2008-0046819 A | 5/2008 |
| TW | 200525859 A | 8/2005 |
| TW | M285846 U | 1/2006 |
| TW | M290574 U | 5/2006 |
| TW | 265668 B | 11/2006 |

OTHER PUBLICATIONS

Office Action dated Nov. 5, 2015 in Taiwan Application No. 103130234.
Office Action dated May 4, 2016 in Korean Application No. 10-2016-0023684.
Office Action dated Jan. 26, 2017 in U.S. Appl. No. 14/437,771.
Office Action dated Sep. 6, 2017 in Taiwanese Application No. 105136133, along with its English Translation.
Office Action dated Dec. 29, 2014 in Korean Application No. 10-2014-0105248.
European Search Report dated Dec. 16, 2014 in European Application No. 14183960.5.
First Office Action dated Mar. 21, 2012 in Chinese Application No. 201110151745.4, filed Nov. 22, 2007.
Supplementary European Search Report dated Apr. 2, 2012 in European Application No. 07834206.0, filed Nov. 22, 2007.
Office Action dated Apr. 23, 2012 in Korean Application No. 10-2006-0116317, filed Nov. 23, 2006.
Office Action dated Apr. 20, 2012 in Korean Application No. 10-2010-0131070, filed Dec. 20, 2010.
Office Action dated Oct. 8, 2012 in Korean Application No. 10-2010-0131070, filed Dec. 20, 2010.

* cited by examiner

[Fig. 1]
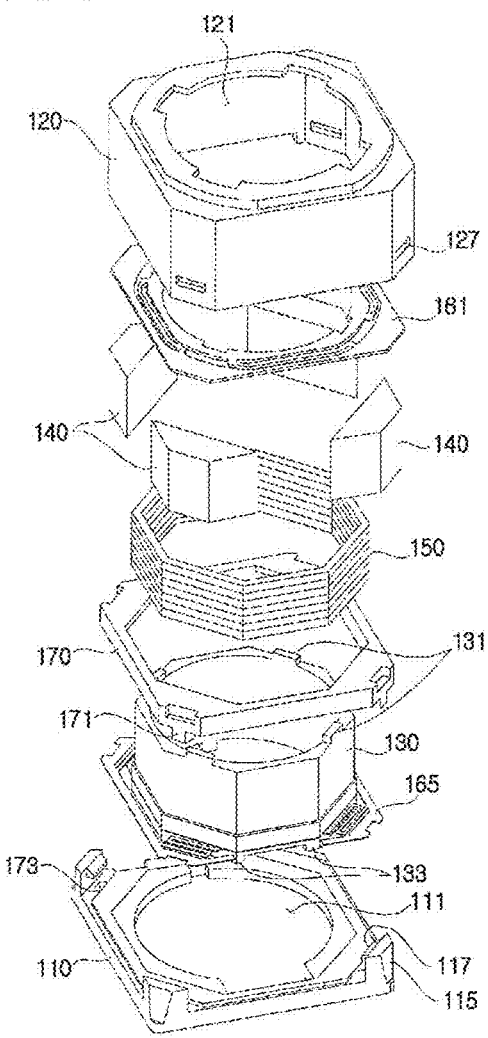
[Fig. 2]
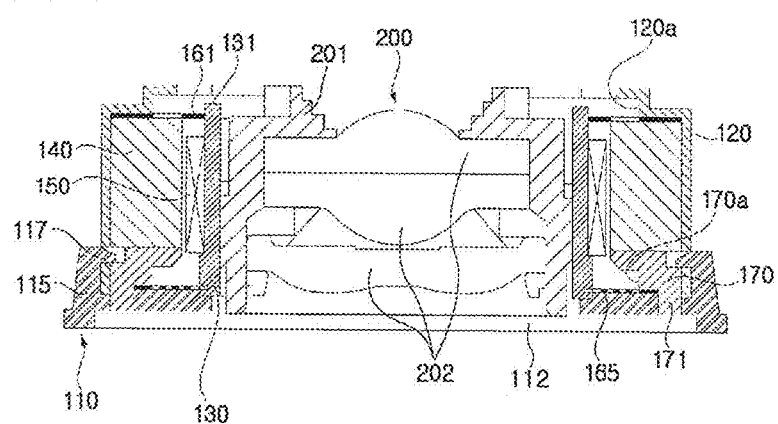

[Fig. 3]
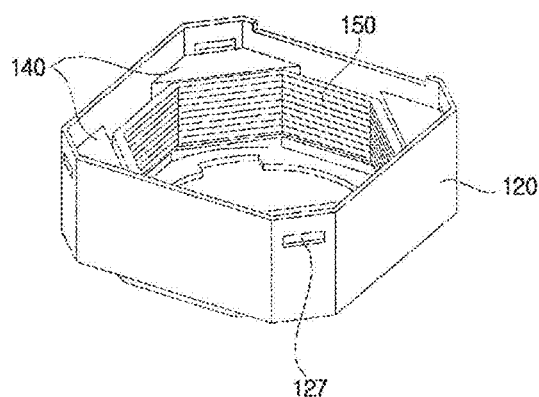
[Fig. 4]
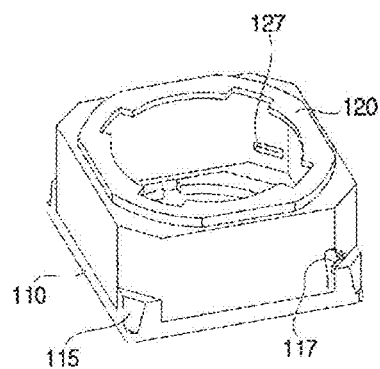

LENS DRIVING APPARATUS

CROSS-REFERENCE TO RELATED APPLICATIONS

This application is a continuation of U.S. application Ser. No. 12/910,293, filed Oct. 22, 2010, now U.S. Pat. No. 8,451,553, issued May 28, 2013, which is a continuation of U.S. application Ser. No. 12/516,146, filed May 22, 2009, now U.S. Pat. No. 7,885,023, issued Feb. 8, 2011, which is the U.S. national stage application of International Patent Application No. PCT/KR2007/005901, filed Nov. 22, 2007, which claims priority to Korean Patent Application No. 10-2006-0116317, filed Nov. 23, 2006, all of which are incorporated herein by reference in their entirety.

TECHNICAL FIELD

The present invention relates to a lens driving apparatus.

BACKGROUND ART

Recently, as electronic appliances have multi-functions, various electronic appliances having cameras therein, such as MP3 players, mobile communication terminals and PDAs, have been widely used.

As electronic appliances having cameras therein are manufactured in a small size, parts for providing camera functions must also be manufactured in a small size.

Further, since electronic appliances having cameras therein may be easily exposed to external environment or impact in terms of the characteristics of portable electronic appliances, external impurities may easily penetrate into the electronic appliances or the electronic appliances may be easily broken by the impact.

Technical Problem

The embodiment provides a lens driving apparatus which can be designed in a simple structure and manufactured in a small size. The embodiment provides a lens driving apparatus having high resistance against impact and preventing penetration of external impurities.

Technical Solution

A lens driving apparatus according to an embodiment comprising: a base; a yoke coupled to the base, having an upper surface formed with a hole, a closed side surface, and an opened bottom surface; a bobbin movably installed in an inner portion of the yoke; a lens module coupled to the bobbin to go in and out the hole according to movement of the bobbin; a magnet fixed to an inner portion of the yoke; a coil fixed to an outer portion of the bobbin while facing the magnets; and springs coupled to the bobbin to provide restoration force to the bobbin.

Advantageous Effects

According to the lens driving apparatus of the embodiment, a yoke is directly coupled to a base and parts are installed in a space formed in an inner portion of the base and the yoke. Accordingly, since an additional case is not necessary, the number of parts is reduced, an assembly procedure is simplified, and thus the manufacturing cost can be saved. Further, according to the lens driving apparatus of the embodiment, the base is coupled to the yoke while maintaining a sealing status by locking holes of the base and locking protrusions of the yoke. That is, any gap does not exist in the sides of the base and the yoke, a hole of the yoke is shielded by a lens module, and a through hole of the base is closely coupled to an electronic appliance, so that impurities can be prevented from penetrating into the inner space formed be the base and the yoke. As a result, the parts are not damaged by the impurities. Furthermore, when a prism magnet is used, since the manufacturing cost is saved as compared with a case of using a ring-shaped magnet, the economical efficiency can be improved.

BRIEF DESCRIPTION OF THE DRAWINGS

FIG. 1 is an exploded perspective view showing a lens driving apparatus according to the embodiment;

FIG. 2 is a sectional view showing the lens driving apparatus in FIG. 1;

FIG. 3 is a perspective view showing a state in which a magnet and a coil are installed at the yoke in FIG. 1; and FIG. 4 is a perspective view showing a coupling state of the yoke and the base in FIG. 1.

MODE FOR THE INVENTION

Hereinafter, a lens driving apparatus according to an embodiment will be described with reference to accompanying drawings. FIG. 1 is an exploded perspective view showing the lens driving apparatus according to the embodiment, FIG. 2 is a sectional view showing the lens driving apparatus in FIG. 1, and FIG. 3 is a perspective view showing a state in which a magnet and a coil are installed at the yoke in FIG. 1.

As shown in FIGS. 1 and 2, the lens driving apparatus according to the embodiment comprises a base 110 and a metal yoke 120 which are coupled to each other to form a predetermined space.

The base 110 has a disc shape or a polygonal plate shape and is formed at the central portion thereof with a through hole 111. The bottom surface of the base 110 is coupled to an electronic appliance (not shown) and a circuit substrate 112 provided with an image sensor (not shown) is arranged in the through hole 111.

The yoke 120 is coupled to the base 110 to serve as a case for protecting parts. The yoke 120 has an upper surface, at which a hole 121 allowing entrance of a lens module 200 is formed, an opened bottom surface making contact with the upper surface of the base 110, and closed lateral side surfaces.

The side surfaces of the lens driving apparatus according to the embodiment are closed by the base 110 and the yoke 120. Accordingly, since an additional case for protecting the lens driving apparatus is not necessary, the structure of the lens driving apparatus can be simplified. Further, since the side surfaces of the lens driving apparatus are closed, external impurities cannot penetrate into the inner side of the lens driving apparatus.

A ring-shaped bobbin 130 that goes in and out the hole 121 is movably installed at the inner side of the yoke 120. The lens module 200 provided with a lens 202 and a support 201 for supporting the lens 202 is coupled to the inner peripheral surface of the bobbin 130.

The bobbin 130 includes an outer surface having a circular or a polygonal shape corresponding to the yoke 120, and an inner surface having a circular shape corresponding to the outer surface of the lens module 200. According to the embodiment, the bobbin 130 includes an outer surface having an octagonal shape.

Magnets 140 are fixed to the inner peripheral surface of the yoke 120, and a coil 150 is wound around the outer peripheral surface of the bobbin 130 while facing the magnets 140.

The magnet 140 has a circular or a polygonal shape corresponding to the yoke 120. As shown in FIGS. 1 and 3, when the yoke 120 is a polygonal case, a plurality of prism magnets 140 are prepared and three sides of each magnet 140 make contact with the inner peripheral surface of the yoke 120.

In the lens driving apparatus according to the embodiment, since the magnets 140 are installed at four edges of the yoke 120, respectively, an empty space between the yoke 120 and the coil 150 can be effectively utilized. Accordingly, the lens driving apparatus can be manufactured in a smaller size. Further, since the prism magnet 140 is inexpensive as compared with a ring-shaped magnet, the lens driving apparatus with a low price can be manufactured.

Since the coil 150 is wound around the outer peripheral surface of the bobbin 130, the coil 150 has a circular or a polygonal shape corresponding to the outer surface of the bobbin 130. If the coil 150 has a polygonal shape and the magnet 140 has a circular shape, the distance between the coil 150 and the magnet 140 becomes non-uniform.

Accordingly, when the coil 150 has a polygonal shape, the magnet 140 has a prism shape as shown in FIGS. 1 and 3.

As electric current is applied to the coil 150, the coil 150 moves upward according to the interaction of the electric field generated by the coil 150 and the magnetic field generated by the magnet 140, and thus the bobbin 130 moves upward. Accordingly, the lens module 200 coupled to the bobbin 130 also moves upward.

In addition, if the electric current is not applied to the coil 150, the bobbin 130 moves downward. To this end, upper and lower leaf springs 161 and 165 having a coil structure are installed at the upper and lower portions of the bobbin 130 in order to provide restoration force for returning the bobbin 130 to the initial state.

At this time, the outer portion of the upper spring 161 is inserted between the yoke 120 and the upper surface of the magnet 140. Further, the inner portion of the upper spring 161 is inserted into first support protrusions 131 formed on the upper end surface of the bobbin 130. Accordingly, the upper spring 161 can be prevented from being rotated and moved due to external impact.

The inner portion of the lower spring 165 is integrally formed with the bobbin 130 through injection molding, and the outer portion of the lower spring 165 is inserted between the bottom surface of a spacer 170 and the base 110. Further, second support protrusions 133 that make contact with the inner peripheral surface of the through hole 110 formed in the base 110 are formed on the lower end surface of the bobbin 130. The second support protrusions 133 guide and support the bobbin 130 such that the bobbin 130 can be coupled to another element at an exact position and exactly move upward and downward.

The spacer 170 is installed at the base 110 below the magnets 140 and the outer surface of the lower spring 165 is inserted between the lower surface of the spacer 170 and the base 110. That is, the outer portion of the lower spring 165 is supported between the spacer 170 and the base 110, and the inner portion of the lower spring 165 is integrally formed with the bobbin 130, so that the lower spring 165 can be prevented from being rotated and moved due to external impact.

Further, the spacer 170 has insertion protrusions 171 used for firm coupling and movement prevention of the spacer 170, and the base 110 has support holes 173 into which the insertion protrusions 171 are inserted.

The yoke 120 and the spacer 170 have step sections 120a and 170a, respectively, as shown in FIG. 2. the step sections 120a and 170a provide a space for movement of the middle parts of the upper and lower leaf springs 161 and 165.

Hereinafter, a coupling structure of the base 110 and the yoke 120 will be described with reference to FIGS. 1, 2 and 4.

FIG. 4 is a perspective view showing a coupling state of the yoke and the base in FIG. 1.

As shown in FIG. 4, the base 110 has a plurality of protrusion plates 115 protruding upward on the outer surface thereof, and locking protrusions 117 are formed at the protrusion plates 115, respectively. Further, the yoke 120 has locking holes 127 at the sides thereof, into which the locking protrusions 117 are inserted.

The base 110 is closely coupled to the yoke 120 by using the locking protrusions 117 and the locking holes 127.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The lens driving apparatus according to the embodiment can be manufactured in a small size, can prevent external impurities from penetrating into the inner portion of the lens driving apparatus, and is not broken due to external impact.

Further, the lens driving apparatus according to the embodiment can be applied to both cameras and various electronic appliances provided with the cameras.

What is claimed is:
1. A lens driving apparatus comprising:
a base comprising an opening, wherein the base comprises an inner lateral surface at the opening;
a yoke coupled to the base, the yoke having an upper plate formed with an opening, a closed side plate extending from an edge of the upper plate, wherein the upper plate and the closed side plate are monolithically formed;
a bobbin disposed in the yoke and configured to move in a first direction along an optical axis, wherein the bobbin comprises a first support protrusion disposed on an upper surface thereof and a second support protrusion disposed on a lower surface thereof;
four magnets fixed to an inner portion of the yoke;
a coil wound around an outer peripheral surface of the bobbin while facing the four magnets; and
springs coupled to the bobbin to provide restoration force to the bobbin,
wherein the springs comprise an upper spring coupled to the upper surface of the bobbin and a lower spring coupled to the lower surface of the bobbin;
wherein the coil has an octagonal shape including eight outer side surfaces, wherein four outer side surfaces of the eight outer side surfaces of the coil face the four magnets, respectively;

wherein each of the four magnets has a prism shape comprising a lower surface, an upper surface, and side surfaces;

wherein the side surfaces of each of the four magnets comprise a first flat plane facing the coil and three flat planes not facing the coil, and the coil comprises four flat planes respectively facing the first flat planes of the four magnets;

wherein the four magnets are disposed at four corners of the yoke, respectively, such that the three flat planes of each magnet comprise a second flat plane, a third flat plane, and a fourth flat plane disposed between the second flat plane and the third flat plane and opposite to the first flat plane, an area of the first flat plane being greater than an area of the fourth flat plane;

wherein the bobbin, the four magnets, the coil, the upper spring, and the lower spring are disposed within a space surrounded by the base and the yoke such that a first side of the upper spring is disposed between the yoke and the upper surface of the four magnets, a second side of the upper spring is coupled to the bobbin, and the first side of the upper spring is vertically overlapped with an inner surface of the upper plate of the yoke at the four corners of the yoke and is horizontally overlapped with the closed side plate of the yoke; and wherein the second support protrusion of the bobbin is inserted into the opening of the base such that the second support protrusion of the bobbin faces the inner lateral surface of the base and is configured to contact the inner lateral surface of the base.

2. The lens driving apparatus as claimed in claim 1, wherein the four magnets comprise a first magnet, and the closed side plate comprises a first side plate and a second side plate perpendicular to the first side plate; and wherein the second flat plane of the first magnet is coupled to the first side plate and the third flat plane of the first magnet is coupled to the second side plate.

3. The lens driving apparatus as claimed in claim 2, wherein the closed side plate of the yoke further comprises a third side plate opposite to the first side plate and a fourth side plate opposite to the second side plate, and wherein the four corners of the yoke comprise a first corner disposed between the first side plate and the second side plate, a second corner disposed between the second side plate and the third side plate, a third corner disposed between the third side plate and the fourth side plate, and a fourth corner disposed between the fourth side plate and the first side plate.

4. The lens driving apparatus as claimed in claim 3, wherein the yoke is disposed at an outermost surface of the lens driving apparatus.

5. The lens driving apparatus as claimed in claim 3, wherein the four magnets are provided between the coil and the yoke.

6. The lens driving apparatus as claimed in claim 2, wherein the fourth flat plane of the first magnet is coupled to the closed side plate of the yoke.

7. The lens driving apparatus as claimed in claim 1, wherein the yoke is formed of metal, wherein the closed side plate of the yoke extends in a direction from the upper plate of the yoke to the base, and wherein the closed side plate of the yoke is coupled to the base.

8. The lens driving apparatus as claimed in claim 7, wherein the lower spring is not in contact with the closed side plate of the yoke, and wherein the lower spring is in contact with the base.

9. The lens driving apparatus as claimed in claim 1, wherein the second side of the upper spring is inserted into the first support protrusion of the bobbin.

10. The lens driving apparatus as claimed in claim 1, further comprising a spacer installed below the four magnets and coupled to the base.

11. The lens driving apparatus as claimed in claim 10, wherein the spacer comprises insertion protrusions and the base comprises support holes into which the insertion protrusions are inserted such that the four magnets are spaced apart from the lower spring and the insertion protrusions of the spacer are disposed below the lower spring.

12. The lens driving apparatus as claimed in claim 1, wherein, for each magnet, the first flat plane and the three flat planes are parallel to the first direction.

13. A camera comprising:
the lens driving apparatus as claimed in claim 1; and
a lens coupled to the bobbin of the lens driving apparatus, wherein the yoke is formed of metal.

14. A digital apparatus comprising the camera as claimed in claim 13.

15. The lens driving apparatus as claimed in claim 1, wherein each of the four magnets is coupled to and supported by an inner surface of the closed side plate of the yoke.

16. The lens driving apparatus as claimed in claim 1, wherein the yoke comprises a locking hole corresponding to a locking protrusion of the base, and wherein the lower surface of the magnet is disposed above the locking hole.

17. The lens driving apparatus as claimed in claim 1, wherein a top surface of the first side of the upper spring is coupled to the inner surface of the upper plate of the yoke, and wherein a bottom surface of the first side of the upper spring directly contacts a top surface of the magnet at the four corners of the yoke.

18. The lens driving apparatus as claimed in claim 1, wherein the upper spring further comprises an intermediate portion connecting the first side to the second side, and wherein a portion of the intermediate portion of the upper spring is vertically overlapped with the inner surface of the upper plate of the yoke, and is separated from the inner surface of the upper plate of the yoke, such that a gap is in the first direction provided between a top surface of the intermediate portion of the upper spring and the inner surface of the upper plate of the yoke.

19. The lens driving apparatus as claimed in claim 18, wherein, when viewed from the bottom, a shape of an inner surface of the yoke is a polygon.

* * * * *